(12) United States Patent
Molesky

(10) Patent No.: US 7,363,584 B1
(45) Date of Patent: Apr. 22, 2008

(54) METHOD AND ARTICLE FOR INTERACTIVE DATA EXPLORATION

(75) Inventor: Lory D. Molesky, Arlington, MA (US)

(73) Assignee: Oracle International Corporation (OIC), Redwood Shores, CA (US)

( * ) Notice: Subject to any disclaimer, the term of this patent is extended or adjusted under 35 U.S.C. 154(b) by 310 days.

(21) Appl. No.: 09/829,903

(22) Filed: Apr. 11, 2001

(51) Int. Cl.
*G06N 3/00* (2006.01)

(52) U.S. Cl. .................................... 715/526

(58) Field of Classification Search ............... 715/500, 715/513, 526, 506, 517, 523, 530, 503, 529
See application file for complete search history.

(56) References Cited

U.S. PATENT DOCUMENTS

| | | | | |
|---|---|---|---|---|
| 4,845,642 A | * | 7/1989 | Itaya et al. ................. | 345/440 |
| 5,226,118 A | * | 7/1993 | Baker et al. ................ | 715/833 |
| 5,581,677 A | * | 12/1996 | Myers et al. ............... | 345/440 |
| 6,016,502 A | * | 1/2000 | Haneda et al. .............. | 715/509 |
| 6,038,561 A | * | 3/2000 | Snyder et al. ................ | 707/6 |
| 6,704,024 B2 | * | 3/2004 | Robotham et al. .......... | 345/581 |
| 6,725,424 B1 | * | 4/2004 | Schwerdtfeger et al. .... | 715/513 |
| 6,791,582 B2 | * | 9/2004 | Linsey et al. ............... | 715/752 |
| 2002/0052891 A1 | * | 5/2002 | Michaud et al. ......... | 707/501.1 |

OTHER PUBLICATIONS

"Microsoft Computer Dictionary: Fifth Edition," 2002, Microsoft Press, p. 562.*
Screenshots from www.iwu.edu/~Ishapiro, via Web Archive (web.archive.org/web/*/http://www.iwu.edu/~Ishapiro), Dec. 6, 1998, Figures 1-3.*
Priester, "Mouse Over Magic," 2000, <http://www.efuse.com/clinic/mouseover>, pp. 1-9.*

* cited by examiner

*Primary Examiner*—Stephen Hong
*Assistant Examiner*—Kyle Stork
(74) *Attorney, Agent, or Firm*—Bingham McCutchen LLP

(57) ABSTRACT

A markup programming technique is described which directs a rendering agent to display at least two charts at the same time and, in response to a cursor operation over one of the charts, to replace the other chart. The cursor operation need not be a mouse click and can simply be the event of moving the cursor into a specified area of the first chart.

23 Claims, 12 Drawing Sheets

```
                                    200
  ┌─210
<A NAME="myanchor"></A>

┌─220      ┌─221
<IMG SRC="mousereplace.gif" ALIGN=CENTER HSPACE=5
      USEMAP="#WORLDPOP" BORDER=0>
                 ↖223
  ┌─230      ┌─231              ┌─233
<IMG NAME="barchart" SRC="bars/worldpop0.gif"
      ALIGN=TOP HSPACE=5>

┌─240      ┌─241
<MAP NAME="WORLDPOP">
    ┌─250      ┌─251
  <AREA SHAPE=POLY
        COORDS="90,110, 150,110, 148,97, 138,74,
    253┐       130,65, 120,58, 108,52, 96,50, 83,50,
                71,52, 60,58, 49,65, 41,74, 35,85,
    255┐       31,97, 30,107, 90,107"
        HREF=#myanchor
        ONMOUSEOVER="document.images['barchart'].src
    257┐       ='bars/worldpop0.gif'">
    ┌─260      ┌─261
  <AREA SHAPE=POLY   ┌─263
        COORDS="90,110, 30,107, ..."
   265→ HREF=#myanchor
        ONMOUSEOVER="document.images['barchart'].src
    267┐       ='bars/worldpop1.gif'">
    ┌─270      ┌─271
  <AREA SHAPE=POLY   ┌─273
        COORDS="90,110, 136,147, ..."
   275→ HREF=#myanchor
        ONMOUSEOVER="document.images['barchart'].src
    277┐       ='bars/worldpop2.gif'">
  ┌─243
</MAP>
```

FIG. 2

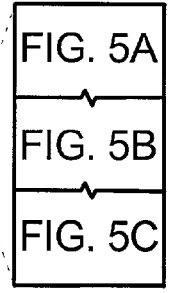

```
                                500
   ┌─510
<A NAME="myanchor"></A>

┌─520      ┌─521
<IMG SRC="mousereplace.gif" ALIGN=CENTER HSPACE=5
     USEMAP="#WORLDPOP" BORDER=0>
              ↖─523
   ┌─530     ┌─531              ┌─533
<IMG NAME="barchart" SRC="bars/worldpop0.gif"
     USEMAP="#worldpop0" ALIGN=TOP HSPACE=5>
   ┌─540   ┌─541  ↖─535         ┌─543
<IMG NAME="agechart" SRC="age/ageChina0.gif"
     ALIGN=TOP HSPAGE=5>

┌─550     ┌─551
<MAP NAME="WORLDPOP">
   ┌─560      ┌─561
  <AREA SHAPE=POLY     ┌─563
         COORDS="90,110, ..., 90,107"
    565 → HREF=#myanchor
         ONMOUSEOVER=
    567 ↗   "document.images["barchart"].src
              ='bars/worldpop0.gif'
            document.images['barchart'].useMap
              ='#worldpop0'
            document.images['agechart].src
              ='age/ageChina0.gif'">
```

FIG. 5A

```
<AREA ...>
                                                              500
    ┌570         ┌571           ┌573
  <AREA SHAPE=POLY COORDS="90,110, 30,107, ..."
   575 → HREF=#myanchor
         ONMOUSEOVER="document.images["barchart"].src
    577 ↗        ='bars/worldpop1.gif'
         document.images['barchart'].useMap
             ='#worldpop1'
         document.images['agechart'].src
             ='age/ageChina1.gif'">
</MAP> ←553
  ┌580
<MAP NAME="worldpop0">
  <AREA SHAPE RECT COORDS="43,121, 62,139"
        HREF=#myanchor
        ONMOUSEOVER="document.images['agechart'].src
            ='ageChina0.gif'">
  <AREA SHAPE RECT COORDS="67,109, 86,139"
        HREF=#myanchor
        ONMOUSEOVER="document.images['agechart'].src
            ='ageChina1.gif'">
  <AREA SHAPE RECT COORDS="92,96, 111,139"
        HREF=#myanchor
        ONMOUSEOVER="document.images['agechart'].src
            ='ageChina2.gif'">
  <AREA SHAPE RECT COORDS="117,84, 136,139"
        HREF=#myanchor
        ONMOUSEOVER="document.images['agechart'].src
            ='ageChina3.gif'">
  <AREA SHAPE RECT COORDS="142,72, 161,139"
        HREF=#myanchor
        ONMOUSEOVER="document.images['agechart'].src
            ='ageChina4.gif'">
</MAP>
```

FIG. 5B

```
<AREA ...>
  ┌570         ┌571              ┌573
<AREA SHAPE=POLY COORDS="90,110, 30,107, ..."
 575→HREF=#myanchor
      ONMOUSEOVER="document.images["barchart"].src
 577↗        ='bars/worldpop2.gif'
      document.images['barchart'].useMap
            ='#worldpop2'
      document.images['agechart'].src
            ='age/ageUSA1.gif'">
</MAP> ←553
  ┌580
<MAP NAME="worldpop0">
 <AREA SHAPE RECT COORDS="43,121, 62,139"
      HREF=#myanchor
      ONMOUSEOVER="document.images['agechart'].src
         ='ageChina0.gif'">
 <AREA SHAPE RECT COORDS="67,109, 86,139"
      HREF=#myanchor
      ONMOUSEOVER="document.images['agechart'].src
         ='ageChina1.gif'">
 <AREA SHAPE RECT COORDS="92,96, 111,139"
      HREF=#myanchor
      ONMOUSEOVER="document.images['agechart'].src
         ='ageChina2.gif'">
 <AREA SHAPE RECT COORDS="117,84, 136,139"
      HREF=#myanchor
      ONMOUSEOVER="document.images['agechart'].src
         ='ageChina3.gif'">
 <AREA SHAPE RECT COORDS="142,72, 161,139"
      HREF=#myanchor
      ONMOUSEOVER="document.images['agechart'].src
         ='ageChina4.gif'">
</MAP>
```

FIG. 5B continued

```
<MAP NAME="worldpop1">
 <AREA SHAPE RECT COORDS="43,121, 62,139"
        HREF=#myanchor
        ONMOUSEOVER="document.images['agechart'].src
            ='ageIndia0.gif'"
 <AREA SHAPE RECT COORDS="67,109, 86,139"
        HREF=#myanchor
        ONMOUSEOVER="document.images['agechart'].src
            ='ageIndia1.gif'"
 ...
</MAP>
    590
<MAP NAME="worldpop2">
 <AREA SHAPE RECT COORDS="43,121, 62,139"
        HREF=#myanchor
        ONMOUSEOVER="document.images['agechart'].src
            ='ageUSA0.gif'"
 <AREA SHAPE RECT COORDS="67,109, 86,139"
        HREF=#myanchor
        ONMOUSEOVER="document.images['agechart'].src
            ='ageUSA1.gif'"
 <AREA SHAPE RECT COORDS="92,96, 111,139"
        HREF=#myanchor
        ONMOUSEOVER="document.images['agechart'].src
            ='ageUSA2.gif'">
 <AREA SHAPE RECT COORDS="117,84, 136,139"
        HREF=#myanchor
        ONMOUSEOVER="document.images['agechart'].src
            ='ageUSA3.gif'">
 <AREA SHAPE RECT COORDS="142,72, 161,139"
        HREF=#myanchor
        ONMOUSEOVER="document.images['agechart'].src
            ='ageUSA4.gif'">
</MAP>               500
```

FIG. 5C

METHOD AND ARTICLE FOR INTERACTIVE DATA EXPLORATION

FIELD OF THE INVENTION

The present invention relates to visual tools for data exploration and more particularly to a method and article for interactively presenting charts.

BACKGROUND OF THE INVENTION

Charts are a convenient and compact way of visually presenting information, especially numeric data. For example, the population of China from 1950 to 2000 can be represented effectively with a bar chart. When implemented on a computer, the presentation of charts can be interactive, allowing the user to navigate the various charts that depict the data set and, hence, explore the data. One common chart navigation feature is known as a "drill down," in which a user selects one element of a chart to obtain more detailed information for that element in another chart. For example, a pie chart may be displayed, showing the relative populations of China, India, and the United States. By clicking on the pie slice for China, the user can immediately bring up a bar chart showing the growth in the Chinese population over the past half-century.

Prior implementations of chart navigation have typically been programmatic, in which enabling a chart to be interactive required a programmer to code the navigation functions in a procedural language such as C or JAVA™. Typically, such code is written and compiled for proprietary applications, such as a spreadsheet. These applications are typically distributed to the users who have purchased the applications, who can then view the charts by executing the applications. The introduction of hypertext on a global scale via the World Wide Web, however, is changing the way information is distributed and displayed. Rather than distributing the proprietary application, the chart information is annotated with a markup language such as HTML and stored on a web server. In response to requests from a user, the server transmits a web page containing the marked up information to the user's rendering agent such as browser. When the browser receives the web page containing the information to be displayed along with the mark-up, the browser renders the information on the screen in accordance with the mark-up annotations embodied in the web page.

Most applications, however, cannot be executed in the context of a browser. For such applications, the user has to download and execute the application by hand or use a facility such as ActiveX to do so. From a performance aspect, this approach is undesirable, because the downloading phase imposes a large initialization time. If the application is compiled to native machine code, as most applications are, executing a downloaded application on the user's computer system raises security concerns, because the application may include a virus or a software defect that damages the user's computer system. JAVA™ is a browser-based programming language that employs virtual machine code rather than native machine code. Even though with JAVA™ applets, which can be embedded into web pages, security concerns are lessened (but still might exist due to security holes in the JAVA™ virtual machine implementation), the initialization overhead is often unacceptably too high.

As a result, there has been some interest in implementing interactive chart navigation in the rendering agent. The rendering capabilities of browsers, however, are primitive, so most authors of web pages adopt a static display approach in presenting their charts interactively. Basically, these web pages reference a single chart at a time. When the user clicks on the chart to drill down, a new web page, which links to another chart with the drill down information, is requested from a server and transmitted to the browser for rendering. This user interface is slow and not easy to use. Mouse clicks are required to bring up the additional chart view. The web page typically displays only one chart, and changing the chart display generally requires fetching another page, which injects delay into the user's exploration process.

Thus, there is a need for a way to implement interactive chart navigation that avoids the security problems and initialization delays of procedural application logic approaches, while being faster and easier to use than typical browser implementations.

SUMMARY OF THE INVENTION

The present invention addresses these and other needs by providing the rendering agent with a computer-readable medium that is marked up to display at least two charts at the same time and, in response to a cursor operation over one of the charts, to replace the other chart. The cursor operation need not be a mouse click and can simply be the event of moving the cursor into a specified area of the first chart. In the example of a drill down operation, one of the charts may be the main chart such as a pie chart, and the other chart may be used to show the drill down information for one of the items (e.g. a slice) of the main chart. Thus, when the user operates the cursor over the first chart (e.g. the main chart), the rendering agent automatically replaces the second chart (e.g. the drill down chart). Because the rendering agent provides the chart navigation functions, the security and slow initialization problems encountered in prior procedural applications logic are avoided.

The identity of the replacement chart can be based on the particular area of the main chart that relates to the user's cursor operation. For example, a pie chart may show three slices, representing the respective populations of China, India, and the United States. A cursor operation over the China slice, in this example, causes the drill down chart to display the population of China from 1950 to 2000. When the cursor is operated over the India slice, the drill down chart is replaced with a chart depicting the population of India from 1950 to 2000.

Accordingly, one aspect of the present invention pertains to software containing instructions in a markup language for interactively presenting information to a user. These instructions are arranged, upon processing by a rendering agent, to cause one or more processors executing the rendering agent to display a first chart and a second chart simultaneously, detect an event relating to the first chart, and, in response to the event, replace the second chart with a third chart so as to display simultaneously the first chart and the third chart. In various embodiments, the first chart may be partitioned into a number of active regions, and the event may be a cursor control event such as moving the cursor over one of the active regions.

In one implementation, the markup instructions comprise a map element specifying an image map, a first image element referencing the first chart and the image map specified by the map element, and a second image element referencing the second chart. The map element includes an area element that has an event attribute specifying replacement of the second chart with a third chart in response to an event. In another implementation, the markup instructions comprise a map element specifying an image map, a first image element referencing a first image to be rendered in a first area and the image map, and a second image element referencing a second image to be rendered in a second area. The map element includes an area element that has a shape attribute specifying a geometry that overlaps at least part of the first area and does not overlap the second area and an event attribute specifying replacement of the second image with a third image in response to an event.

Another aspect of the present invention involves software for displaying a first chart, a second chart, and a third chart simultaneously. In response to an event relating to the first chart, the second and third charts are replaced with a fourth and fifth charts, respectively, so as to display simultaneously the first chart, the fourth chart, and the fifth chart. In response to an event relating to second chart, replacing the third chart with a sixth chart so as to display simultaneously the first chart, second chart, and the sixth chart.

In one implementation, the markup instructions to implement the software include a first map element specifying a first image map, a second map element specifying a second image map, a first image element referencing a first image to be rendered in a first area and the first image map, a second image element referencing a second image to be rendered in a second area and the second image map, and a third image element referencing a third image to be rendered in a third area. The first map element includes an area element that has a shape attribute specifying a geometry that overlaps at least part of the first area and does not overlap the second area and an event attribute specifying replacement of the second image map with a third image map in response to an event.

Additional aspects of the present invention relate to methods of producing the software and methods of operating the software in a rendering agent.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 depicts a computer-readable medium bearing mark-up instructions for rendering information in accordance with the embodiment of the present invention exemplified in FIG. 1.

FIG. 5, which is subdivided into FIGS. 5A, 5B, and 5C, depicts a computer-readable medium bearing mark-up instructions for rendering information in accordance with the embodiment of the present invention exemplified in FIG. 4.

DESCRIPTION OF THE PREFERRED EMBODIMENT

Figure 1:
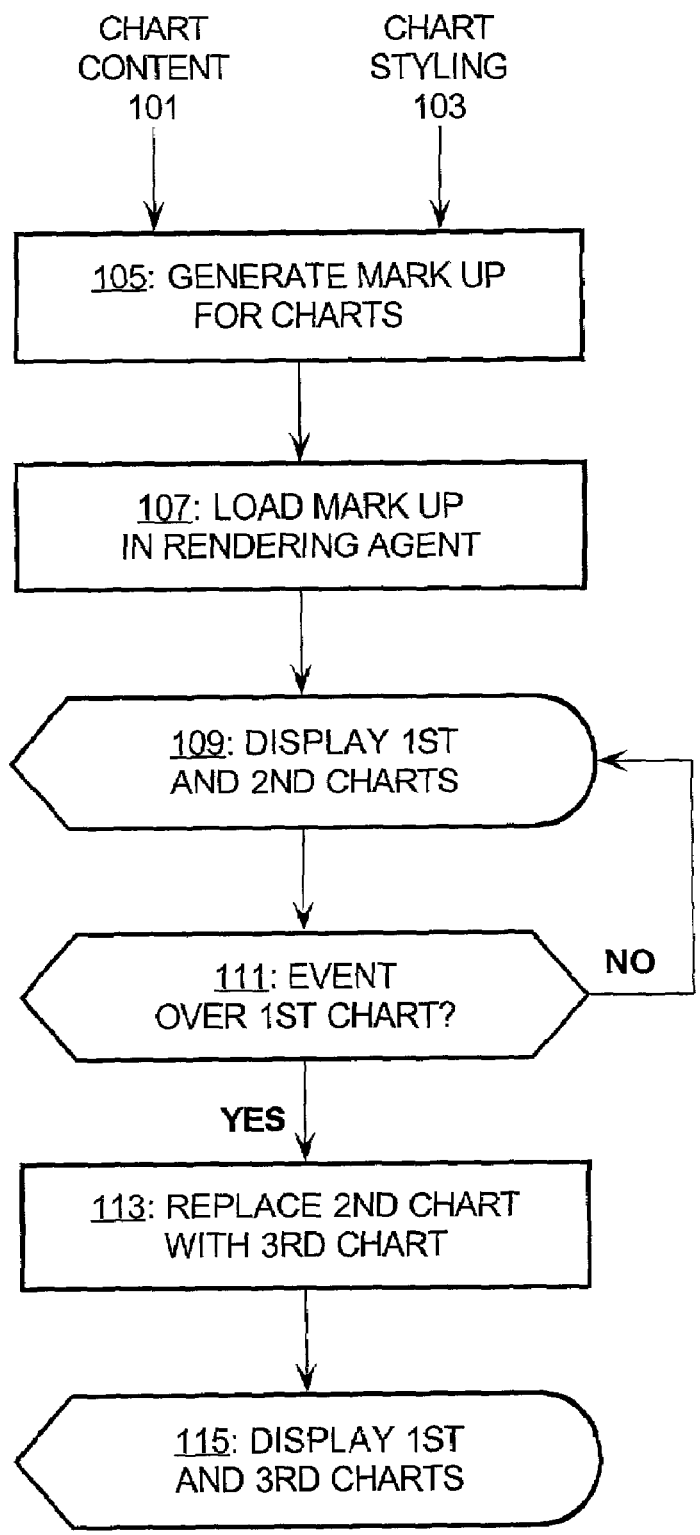
FIG. 1 is a flowchart exemplifying the operation of an embodiment of the present invention.

A system, method, and software for interactive data exploration are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Dynamic Rendering Agents

A rendering agent is a piece of software that is responsible for receiving a page of information that has been marked up in accordance with a markup language, formatting the information in accordance with the markup, and outputting the formatted information. The most common type of rendering agent is an Internet browser, such as the NETSCAPE™ NAVIGATOR™ browser and the MICROSOF™ EXPLORER™ browser, which displays the formatted information on a computer monitor, but other types of rendering agents may be used for other kinds of displays, e.g. a screen on a PDA (personal digital assistant) or portable telephone, Braille output devices, and even paper output. The most popular markup language is the Hypertext Markup Language (HTML), but other markup languages or page description languages, such as SGML, XML, and PDF, can also be used. Although the following description may, for convenience of illustration, refer to browsers as a specific example of a rendering agent and to HTML as a specific example of a markup language, the present invention is not limited to the use of browsers and HTML and may be beneficially employed with other types of rendering agents and markup languages.

A dynamic rendering agent is a piece of software that is capable of changing the rendered output in response to user actions without having to load or receive additional markup instructions (although, for performance reasons, the dynamic rendering agent may defer requests for images until the images are ready to be displayed). By contrast, a static rendering agent only changes the rendered output by loading a new page of markup. Thus, to display a new image, a static browser typically requires the user to click on a link for a new page that references the new image. When the user clicks on the link, a new page is loaded and rendered. Alternatively, the static browser could use an animated image, but animated images are not interactive because they do not change in response to a user's action.

Typically, the dynamic rendering agents permit the markup to include the specification of user events and a script of actions to be performed in response to the specified events. The first Internet browsers to permit scripts include NAVIGATOR™ 2 and EXPLORER™ 3. Whenever a scriptable browser loads a web page, the browser organizes the entities marked up in the web page as a hierarchical document object. The Document Object Model (DOM) is a recent attempt by W3C.org to standardize the hierarchical document into a platform- and language-neutral interface that allows programs and scripts to dynamically access and update the content, structure, and style of documents and web pages. DOM and other dynamic markup rendering techniques are described in greater detail in Danny Goodman, *Dynamic HTML: The Definitive Reference* (O'Reilly, 1998).

The use of DOM and other dynamic rendering techniques, however, is still very much in its infancy. Although DOM has been used with scriptable browsers to implement image rollovers (e.g. a button that changes color or styling when the user moves a mouse cursor over the button), the power of DOM and browser scripting has not as yet been fully realized. In part, this is due to the newness of DOM and the incompatibility between MICROSOFT™ and NETSCAPE™ for all but the simplest of scripts. The present invention stems, however, from the realization that particular combinations of such dynamic rendering techniques can be applied in a completely new direction to implement interactive chart navigation in a manner that provides convenience of use without compromising security or imposing large initialization delays.

Dynamic Image Replacement

In accordance with one embodiment of the present invention, whose operation is illustrated in FIG. 1, dynamic image replacement techniques are used to implement interactive chart navigation. For example, a browser may display a main chart and a drill down chart simultaneously. In response to a user's cursor action over the main chart, the browser replaces the drill down chart that is currently being displayed with another drill down chart that corresponds to the part of the main chart over which the cursor action occurred. Although embodiments of the present invention are illustrated with respect to a working example involving a main chart and drill down charts, the present invention is not limited to these particular kinds of charts and may be profitably employed with other configurations of charts.

Referring to FIG. 1, a preliminary step is to gather chart content 101 and the chart styling 103 information, from which the markup for the rendering browser is generated. The chart content 101 information comprises the data points and other information that make up the main and drill down charts, and the chart styling 103 information includes the direction for how the charts will look, such as the fonts, colors, chart types (e.g. line, area, bar, candlestick, pie, and mixed), labeling (e.g. annotations and markers), and layout (e.g. basic, stacked, clustered, vertical, horizontal, etc.).

At point 105, the markup for the charts is generated based on the chart content 101 and the chart styling 103 information and embodied in a computer-readable medium. This generation can be performed by functions of an application program interface (API), by a separate program, by hand, or by any other technique that produces markup. In our working example, the markup output is stored in a single web page 200, selective portions of which are illustrated in FIG. 2. Web page 200 includes an anchor element 210, which marks the destination of a hypertext link named "myanchor." This link is located right before the position of the two charts of the working example.

Figure 3A:
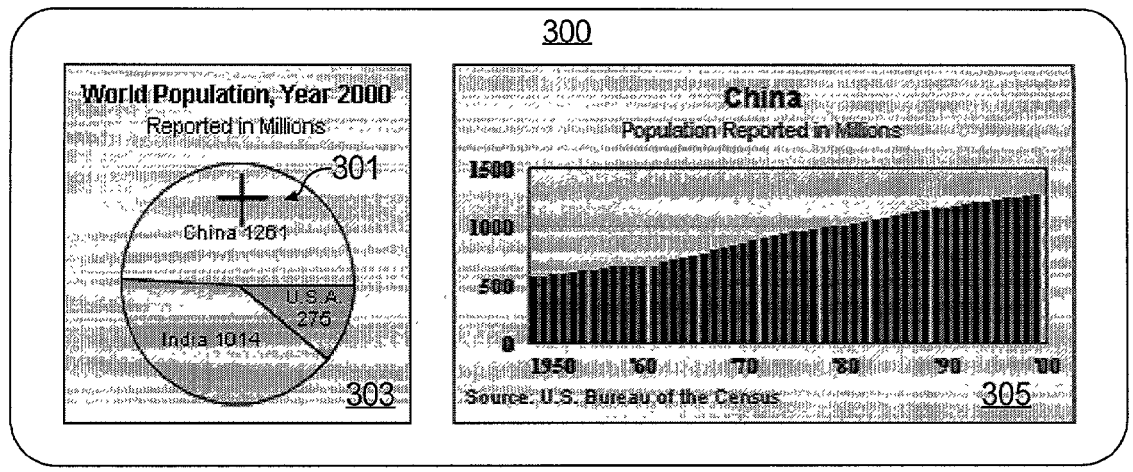
FIGS. 3A, 3B, and 3C are exemplary screen displays produced during the operation of the embodiment of the present invention exemplified in FIG. 1.

The first chart, e.g. the main chart in the working example, is specified by the first image element 220. The first image element 220 includes a number of attributes, including a source attribute 221 that references the image (i.e. identifies "mousereplace.gif" as the name of the file that contains the image) and a useMap attribute 223 that specifies a client-side image map called "WORLDPOP" that sets a number of "hot" areas on the first chart. A hot area is an active region of the chart that is defined to be responsive to cursor, keyboard, and other user actions. As illustrated in FIG. 3A, the first chart is a pie chart 303 entitled "World Population, Year 2000" showing the population reported in millions of China as 1261, India as 1014, and the U.S.A. as 275. Since users would like to drill down on the population figures in the pie chart 303, the hot areas of the pie chart 303 correspond to the individual three slices.

Referring back to FIG. 2, the second image element 230 specifies the second chart, e.g. the default drill down chart, and includes a name attribute 231 of "barchart" that identifies the second chart in DOM and a source attribute 233 that references the image of the second chart (in a file called "bars/worldpop0.gif"). The second chart is displayed in FIG. 3 as a drill down chart 305, which shows the population of China, reported in millions, from 1950 to 2000. The convenience and compactness of charts is evident in this example, because one can tell at a glance that the population of China generally increased from 500 million in 1950 to about 1250 million in 2000, with a brief leveling that took place in the late 1950s at the time of the Great Leap Forward policy.

Referring again to FIG. 2, the client-side image map specified in the first image element 220 by the name "WORLDPOP" is now defined by map element 240 and named by its name attribute 241. The map element 240 includes a number of area elements 250, 260, and 270 that define the respective hot areas of the image map and, hence, of the main chart. A closing tag 243 terminates the enclosure of the map elements 240, 250, and 260.

The first hot area of the image map is defined by the area element 250. The area element 250 uses a shape attribute 251 and a "coords" attribute 253 to define the geometry of the first hot area. More specifically, with regard to the working example, the shape attribute 251 indicates that the shape is a polygon whose coordinates are specified by the coords attribute 253. These coordinates trace the perimeter of the China 1261 slice in the pie chart 303 of FIG. 3A. Other values for the shape attribute 251 can be RECT for rectangular and CIRC for circular, for which the coords attribute 253 is suitably interpreted. The area element 250 also includes an href attribute 255 that specifies the destination of a hyperlink in case the user clicks in the hot area. In the working example, the destination of the hyperlink is "myanchor," which was set by the anchor element 210.

The "onMouseOver" attribute 257 specifies the action that the browser is to take in response to the user's movement of the cursor to enter over the hot area. In this case, the action to take is specified by a short script that reassigns the source attribute of the image referenced in DOM object "document.images['barchart'].src" to reference the image stored in the "bar/worldpop0.gif" file. The image referenced as "barchart" is none other than the second image, defined by the second image element 230's name attribute 231 as having the "barchart" name. Correspondingly, the reassigned source attribute is the source attribute 233 of the second image element 230.

Various events involving a mouse, its cursor control equivalent (e.g. a trackball), or its keyboard equivalent are available to an area element such as area element 250, and the present invention is not limited to any particular event, although the onMouseOver event is one of the most convenient to the user. The events that are available to an area element include: on Blur (when the area element loses the input focus due to clicking somewhere else or pressing the Tab key), onClick (when the user pressed and released the mouse button over the element), onDblClick (when the user pressed and released the mouse button twice in rapid succession over the element), onDragStart (when the user has begun selecting content with the mouse), on Focus (when the area element received the input focus), onhelp (when user presses the F1 key or selects a help menu item), onKeyDown (when the user is pressing a key on the keyboard), onKeyPress (when the user has pressed and released a key on the keyboard), onKeyUp (when the user has released a key on the keyboard), onMouseDown (when the user is pressing a button on the mouse), onMouseMove (when the user is rolling the mouse), onMouseOut (when the mouse cursor is rolled out of the element), onMouseOver (when the mouse cursor is rolled into the element), onMouseUp (when the user has released a button on the mouse), and onSelectStart (when the user is beginning to select the element). For chart navigation, the onMoveOver, onClick, and onMouseOut events are the most convenient.

A second area element 260 defines the second hot area in the image map. In particular, the shape attribute 261 and the coords attribute 263 (some of whose points are abbreviated from FIG. 2 with an ellipsis for ease of illustration) specify the geometry of the second hot area, which, in the working example, corresponds to the population of India. The href attribute 265 specifies the destination of a hyperlink in case the user clicks in the hot area, and the onMouseOver attribute 267 specifies that the current image named "barchart" is to be replaced by the image in the file referenced as "bars/worldpop1.gif".

Likewise, a third area element 270 defines the third hot area in the image map. In particular, the shape attribute 271 and the coords attribute 273 (some of whose points are abbreviated) specify the geometry of the third hot area, which corresponds to the population of the United States in the working example. The href attribute 275 specifies the destination of a hyperlink in case the user clicks in the hot area, and the onMouseOver attribute 277 specifies that the current image named "barchart" is to be replaced by the image in the file referenced as "bars/worldpop2.gif".

With reference back to FIG. 1, at point 107, the generated markup is made accessible to a computer system executing a rendering agent and loaded into the rendering agent. Typically, the markup is embodied in a single web page on a storage disk belonging to a server and, in response to a user's request, is transmitted from the server to the computer system that executes the rendering agent. However, in other implementations, the web page can be generated locally and stored on the hard drive of the rendering agent's computer system.

When the rendering agent loads the markup embodied in a computer-readable medium, the rendering agent begins to process the markup, format the embedded information, and output the information, e.g. to be displayed on a computer monitor. At point 109, the rendering agent processes the first image element 220 and the second image 230 of FIG. 2 to display the first and second charts simultaneously. A result of this processing is shown on screen 300 in FIG. 3A, with the pie chart 303 displayed next to the population drill down chart 305. Also shown on screen 300 is a mouse cursor 301, which is currently positioned over the China slice of the pie chart 303. Because of that position of the mouse cursor 301, the population drill down chart 303 is for China from 1950 to 2000.

Figure 3B:
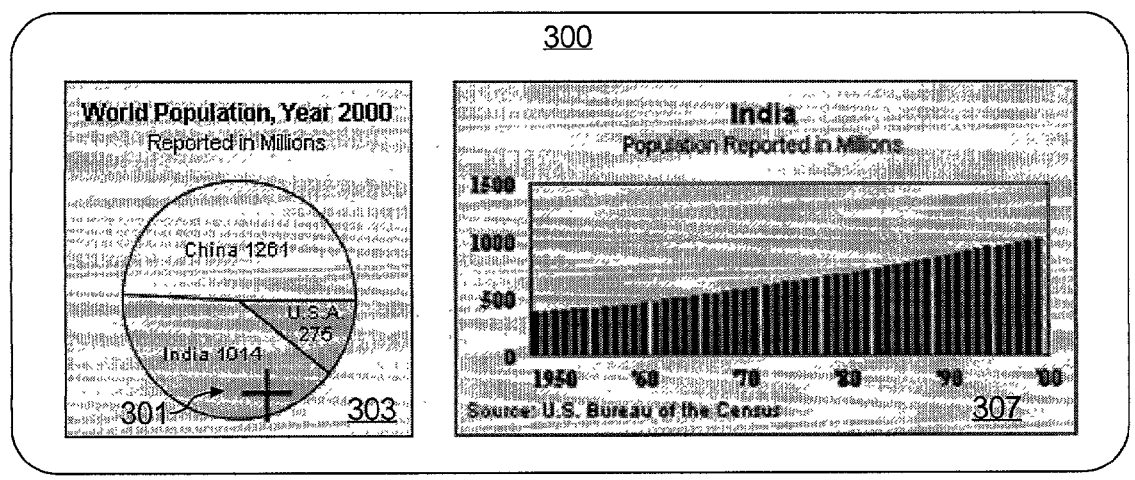

When the user rolls the mouse to move the mouse cursor 301, for example from the China slice to the India slice in the pie chart 303 as shown in FIG. 3B, the browser detects this motion and checks to see if this event occurs over any of hot areas of the first chart (FIG. 1, point 111). In the working example, the geometries of these hot areas have been defined by the shape and coords attributes of the area elements 250, 260, and 270. If there is no such mouse event, then execution loops back to point 109 where the first and second charts continue to be displayed simultaneously.

If, on the other hand, there is such a mouse event, then execution proceeds to point 113 where the script code specified for that event is processed. Because the mouse event is a movement of the mouse cursor 301 over the second hot area, defined by the second area element 260, the action specified in the second area element 260 in the onMouseOver attribute 267 is performed. That action is specified by a script instruction "document.images['barchart'].src='bars/worldpop1.gif'" which causes the source attribute 233 of the second image 230 (denominated "barchart" by the name attribute 231) to reference the image stored at bars/worldpop1.gif". This replacement causes the browser at point 115 to display a third image 307, showing the population of India from 1950 to 2000, simultaneously with the pie chart 303.

Figure 3C:
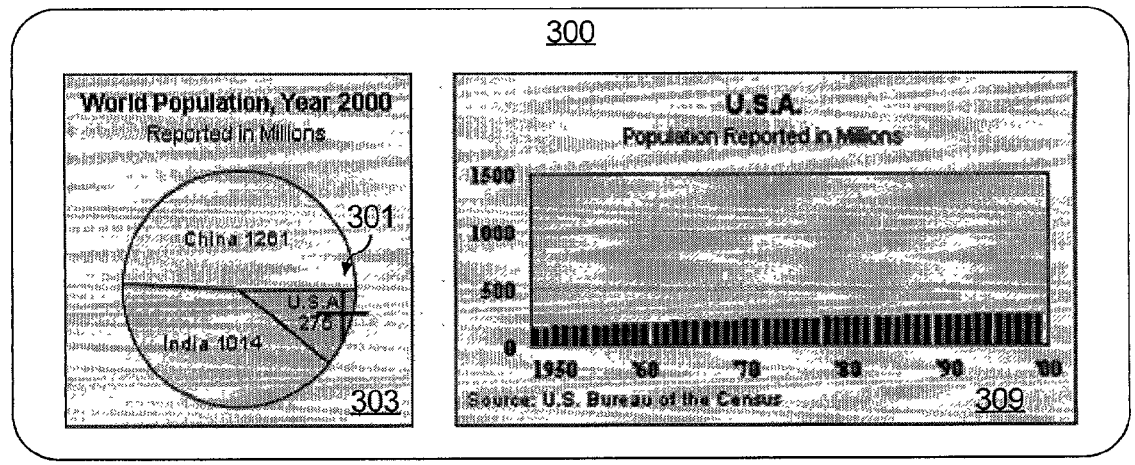

Referring now to FIG. 3C, if the mouse cursor 301 is again moved, but this time from the India slice to the U.S.A. slice of the pie chart 303, then the browser proceeds through points 111-115 again but with respect to the third area 270. This action replaces the third chart 307 with a fourth chart 309 showing the population for the United States from 1950 to 2000.

Accordingly, a technique has been described for interactive chart navigation, in which a chart is dynamically replaced because of mouse events that occur on another chart. Thus, movements of the mouse in the pie chart 303 cause the drill down charts 305, 307, and 309 to be automatically replaced and displayed, without having to make any mouse clicks. Moreover, the scripts use only a simple assignment instruction to a DOM object, which is compatible with both the NAVIGATOR™ and the EXPLORER™ browsers. The resulting user interface is more convenient and easier to use, because it does not require mouse clicks, but does not require procedural application logic to be downloaded to the browser's computer system and executed, thereby advantageously avoiding its associated security problems and long initialization times.

Dynamic Image Map Replacement

Figure 4:
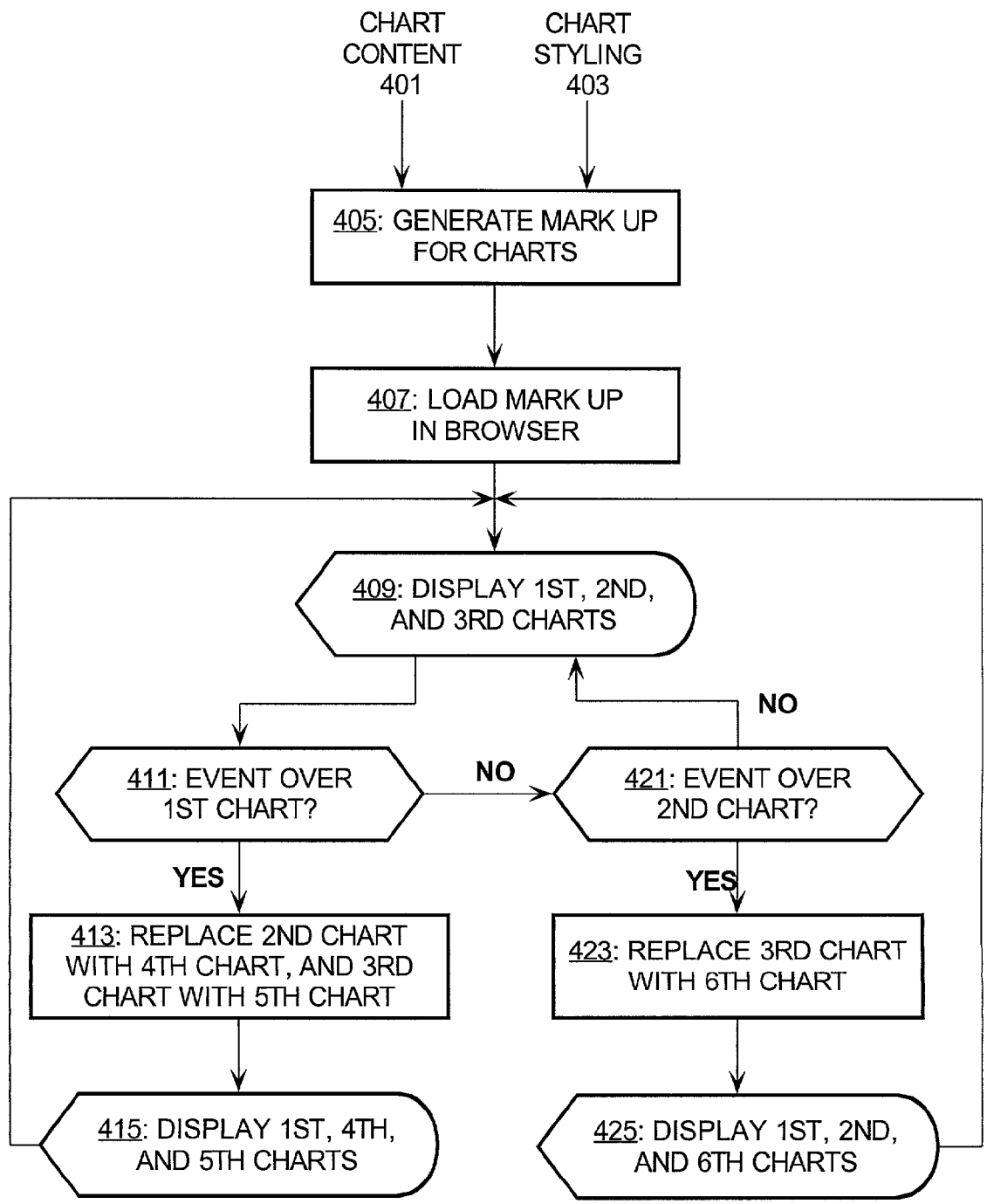
FIG. 4 is a flowchart exemplifying the operation of another embodiment of the present invention.

The previous description relates to a dynamic image replacement technique. In another embodiment of the present invention, this concept is extended to a dynamic image map replacement technique, in which at least one additional level of navigable charts are presented. Referring to FIG. 4, which shows the operation of an implementation of this embodiment, the markup for the charts is generated based on the chart content 401 and the chart styling 403 information and embodied in a computer-readable medium (at point 405).

Figure 6A:
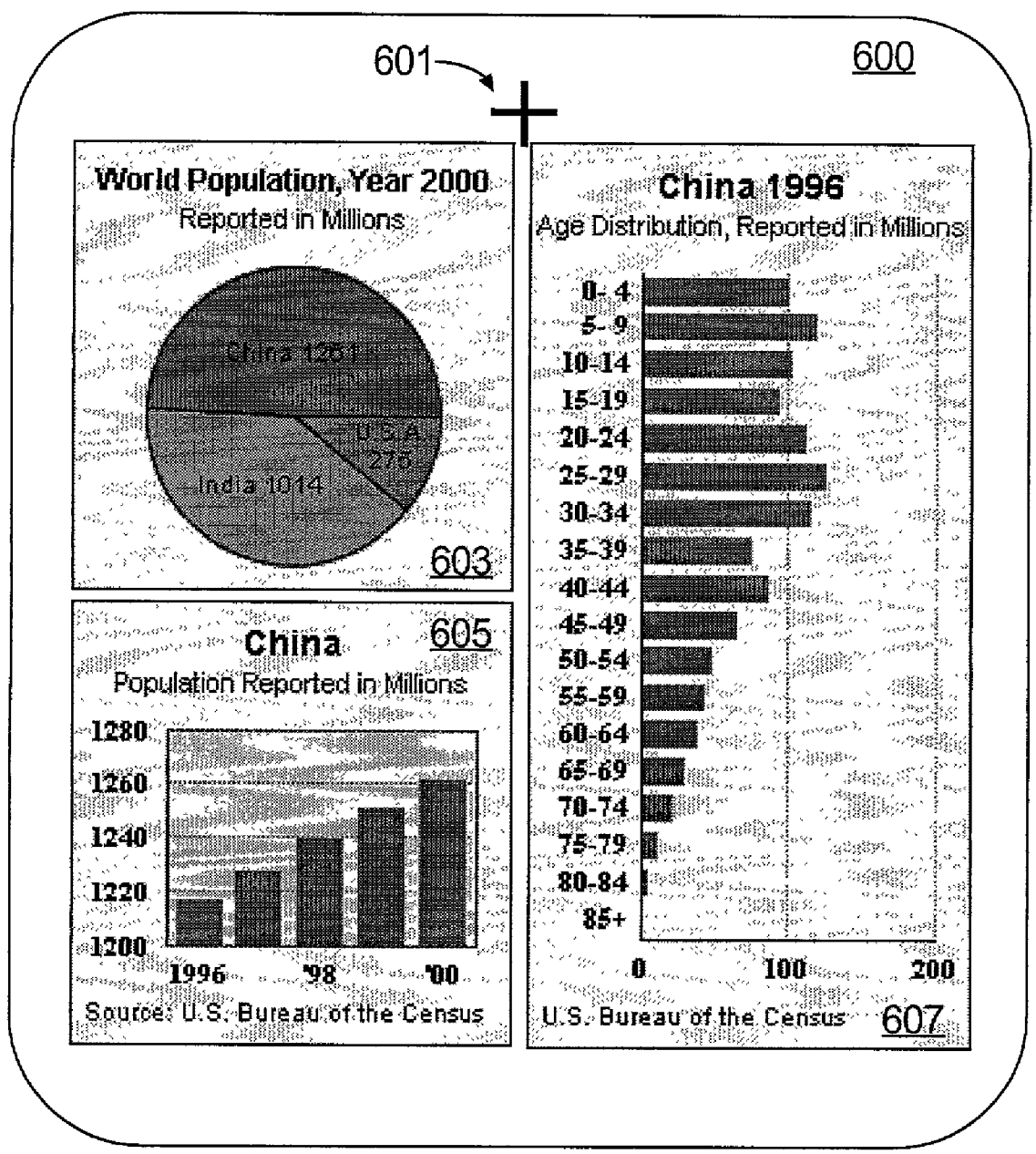
FIGS. 6A, 6B, and 6C are exemplary screen displays illustrating the operation of the other embodiment.
Figure 6B:
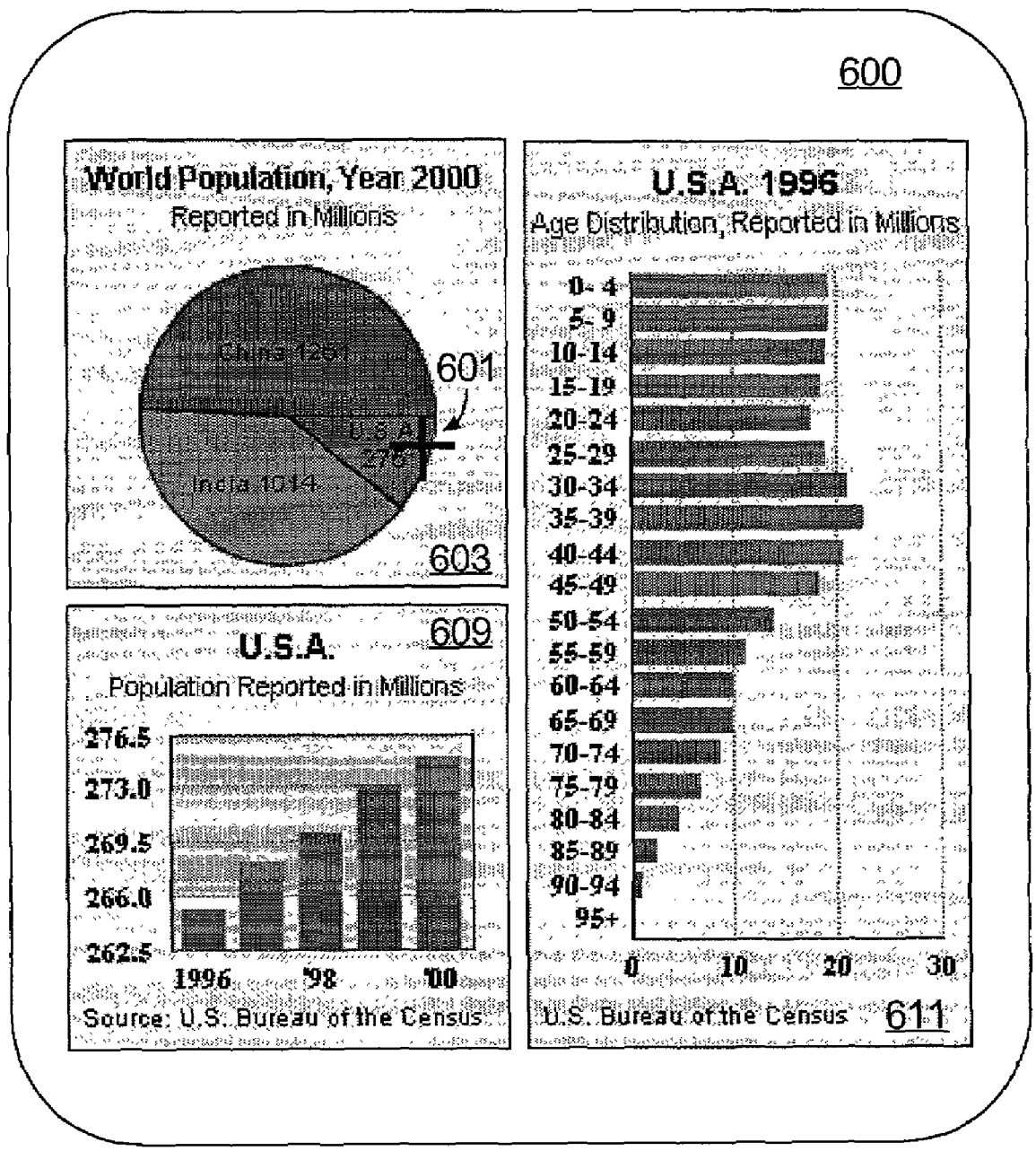
Figure 6C:
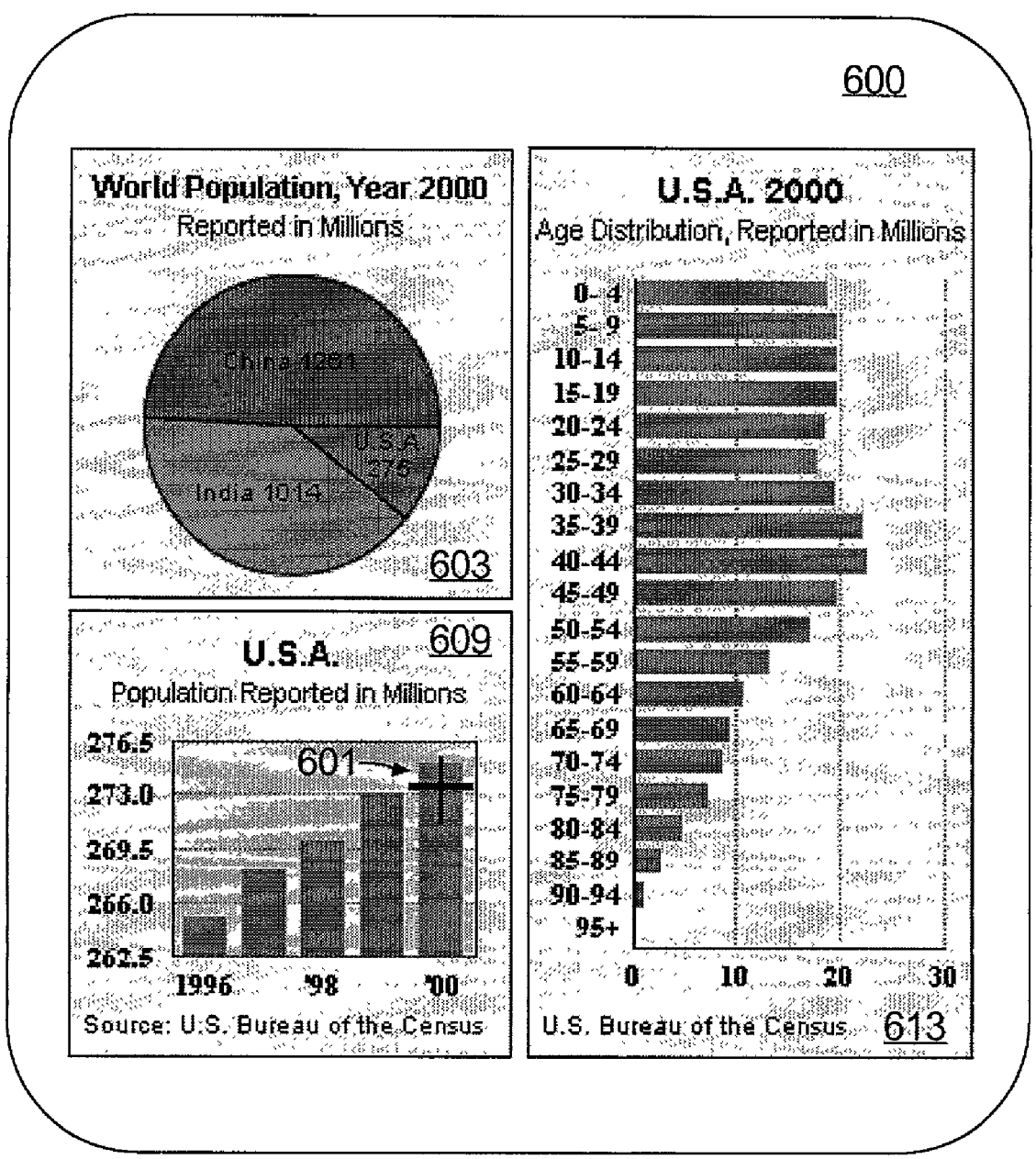

The operation of this embodiment is illustrated with respect to a three chart working example, whose markup is stored in a single web page 500, selective portions of which are illustrated in FIG. 5, subdivided into FIGS. 5A, 5B, and 5C. The screen displays of this working example are depicted in FIGS. 6A, 6B, and 6C and contain two active charts. A pie chart 603 is active, such that operation of the cursor 601 into each slice invokes a new population bar chart 605 (and its associated image map) and a new age distribution chart 607. The population bar chart 605 is also active, such that operation of the cursor 601 into a bar invokes a new age distribution chart 607 for the corresponding year. Since there are many possible instances of the active population bar chart 603 (e.g. China, India, and the U.S.A), the replacement process replaces both the population bar chart 605 and the image map associated with the population bar chart 607.

Referring now to FIG. 5A, web page 500 includes an anchor element 510, which marks the destination of a hypertext link named "myanchor." This link is located right before the position of the two charts of the working example.

The first chart, e.g. the main chart in the working example, is specified by the first image element 520. The first image element 520 includes a source attribute 521 that references the image (i.e. identifies "mousereplace.gif" as the name of the file that contains the image) and a usemap attribute 523 that specifies a client-side image map called "WORLD-POP". As illustrated in FIG. 6A, the first chart is a pie chart 603 entitled "World Population, Year 2000" showing the population, reported in millions, of China as 1261, India as 1014, and the U.S.A. as 275. Since users would like to drill down on the population figures in the pie chart 603, the hot areas of the pie chart 603 correspond to the individual three slices.

Referring back to FIG. 5A, a second image element 530 specifies the second chart, e.g. a population drill down chart, and includes a name attribute 531 of "barchart" that identifies the second chart in DOM as "barchart" and a source attribute 533 that references the image of the second chart (in a file called "bars/worldpop0.gif"). The second image element 530 also has a usemap attribute 535 that specifies the image map named "worldpop0". The second chart is displayed in FIG. 6A as population drill down chart 605, which shows the population of China, reported in millions, from 1996 to 2000.

With continued reference to FIG. 5A, a third image element 540 specifies a third chart, e.g. an age drill down chart, and includes a name attribute 541 of "agechart" that identifies the third chart in DOM as "agechart" and a source attribute 543 that references the image of the third chart (in a file called "age/ageChina0.gif"). The third chart is displayed in FIG. 6A as age drill down chart 607, which shows the age distribution of the population of China, reported in millions, from 0-4 to 85+.

FIG. 5A, the client-side image map named "WORLD-POP" in the first image element 520 is now defined by a first map element 550 and named by its name attribute 551. The first map element 550 includes a number of area elements, of which area element 560 is shown in FIG. 5A and area elements 570 and 580 are shown in FIG. 5B. Area element 560 of FIG. 5A has a shape attribute 561 and a "coords" attribute 563 to define the geometry of the first hot area, e.g. over the China 1261 slice of the pie chart 603 in FIG. 6A. The area element 560 also includes an href attribute 565 and an onMouseOver attribute 567, which specifies that the browser is to execute a short script that sets the useMap attribute 535 of the first image 520 (i.e. the DOM object "document.images['barchart'].useMap") to reference the image map named "worldpop0".

For ease of illustration, the second image map, which relates to the data for the population of India, is abbreviated in FIG. 5B. A third area element 570, for the U.S.A., defines the third hot area in the image map for main pie chart 603. In particular, the shape attribute 571 and the coords attribute 573 specify the geometry of the third hot area, e.g. the pie slice corresponding to the U.S.A. The href attribute 575 specifies the destination of a hyperlink in case the user clicks in the hot area, and the onMouseOver attribute 577 specifies that the useMap attribute 535 of the first image 520 is to reference the image map named "worldpop2". The image map element 550 also includes other area elements, whose attributes are omitted for ease of illustration, and is terminated by a closing tag 553.

The web page 500 also includes definitions of client-side image maps for each of the various population drill down charts so that users can drill down on the particular year to look at the age distribution of the population for that year. For example, map element 580 specifies an image map over the China population map with five hot areas corresponding to each of the bars for each of five years. Each of the area elements has an onMouseOver attribute that specifies the replacement of the age distribution chart to the appropriate age distribution chart for the year in the current hot area. In FIG. 5C, map element 590 shows the corresponding markup for the U.S.A.

Referring back to FIG. 4, at point 407, the generated markup is made accessible to a computer system executing a rendering agent and loaded into the rendering agent. When the rendering agent loads the markup embodied in a computer-readable medium, the rendering begins to process the markup, format the embedded information, and output the information, e.g. to be displayed on a computer monitor. At point 409, the rendering agent processes the first image element 520, the second image element 530, and the third image 540 element of FIG. 5A to display the first, second, and third charts simultaneously. A result of this processing is shown on screen 600 in FIG. 6A, with the pie chart 603, the population drill down chart 605, and the age distribution chart 607 being displayed simultaneously. In the initial display, the population chart for China and the Chinese age distribution chart for the year 1996 are displayed. Also shown on screen 600 is a mouse cursor 601.

When the user moves the mouse cursor 601, for example to the U.S.A. slice in the pie chart 603 as shown in FIG. 6B, the browser detects this motion and checks to see if this event occurs over any of hot areas of the first chart (FIG. 4, point 411). In the working example, the geometries of these hot areas have been defined by the shape and coords attributes of the area elements 560, 570, and 580. If there is no such mouse event, then execution loops back to point 421.

If, on the other hand, there is such a mouse event, then execution proceeds to point 413 where the script code specified for that event is processed. Because the mouse event is a movement of the mouse cursor 601 over the third hot area, defined by the third area element 570, the action specified in the third area element 570 in the onMouseOver attribute 577 is performed. That action comprises a series of script statements. The first statement "document.images ['barchart'].src='bars/worldpop2.gif'" causes the source attribute 533 of the second image 530 (denominated "barchart" by the name attribute 531) to reference the image stored at "bars/worldpop2.gif". The second statement "document.images['barchart'].useMap='#worldpop2'" causes the useMap attribute 535 of the second image 530 to use the image map named "worldpop2" (i.e. the image map defined by image map element 590). The third script statement "document.images['agechart'].src='age/ ageUSA1.gif'" causes the age distribution drill down chart to be replaced in the DOM. These replacements cause the browser at point 415 to display a fourth image 609, showing the population of the U.S.A. from 1996 to 2000, and a fifth image 611, showing the age distribution for 1996 in the U.S.A., simultaneously with the pie chart 603.

Referring now to FIG. 6C, if the mouse cursor 601 is again moved, but this time to the bar for the year 2000 the population drill down chart 609, then the browser proceeds through points 421-425, which dynamically replaces the image of the age distribution chart. Thus, this action replaces the third chart 611 with a sixth chart 613 showing the age distribution of the population for the United States for the year 2000.

Accordingly, a technique has been described for interactive chart navigation, in which an image map is dynamically replaced in response to mouse events that occur on another chart. This user interface is more convenient and easier to use but does not require procedural application logic to be downloaded to the browser's computer system and executed, thereby advantageously avoiding its associated security problems and long initialization times.

Hardware Overview

Figure 7:
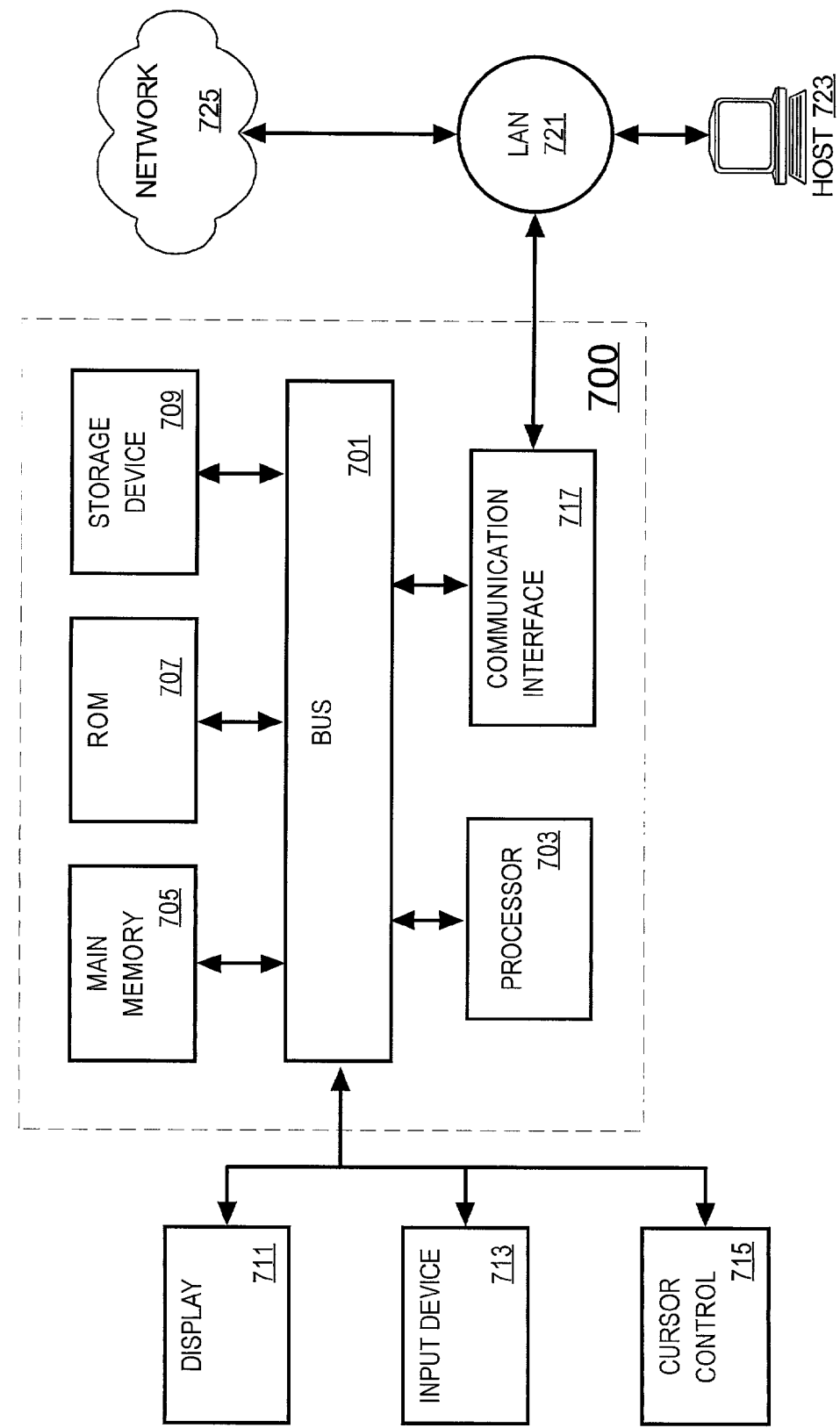
FIG. 7 depicts a computer system that can be used to implement an embodiment of the present invention.

FIG. 7 illustrates a computer system 700 upon which an embodiment according to the present invention can be implemented. The computer system 700 includes a bus 701 or other communication mechanism for communicating information, and a processor 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions to be executed by the processor 703. The computer system 700 further includes a read only memory (ROM) 707 or other static storage device coupled to the bus 701 for storing static information and instructions for the processor 703. A storage device 709, such as a magnetic disk or optical disk, is additionally coupled to the bus 701 for storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is cursor control 715, such as a mouse, a trackball, or cursor direction keys for communicating direction information and command selections to the processor 703 and for controlling cursor movement on the display 711.

According to one embodiment of the invention, interactive data exploration is provided by the computer system 700 in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the present invention. Thus, embodiments of the present invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, or a telephone modem to provide a data communication connection to a corresponding type of telephone line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by service provider. The local network 721 and network 725 both use electrical, electromagnetic, or optical signals to convey information and instructions. The signals through the various networks and the signals on network link 719 and through communication interface 717, which communicate digital data with computer system 700, are exemplary forms of carrier waves bearing the information and instructions.

The computer system 700 can send messages and receive data, including program code, through the network(s), network link 719, and communication interface 717. In the Internet example, a server (not shown) might transmit requested code belonging to an application program for implementing an embodiment of the present invention through the network 725, local network 721 and communication interface 717. The processor 703 may execute the transmitted code while being received and/or store the code in storage device 709, or other non-volatile storage for later execution. In this manner, computer system 700 may obtain application code in the form of a carrier wave.

The term "computer-readable medium" as used herein refers to any medium that participates in providing instructions or data to the processor 703 for execution. Such a medium may take many forms, including but not limited to non-volatile media, volatile media, and transmission media. Non-volatile media include, for example, optical or magnetic disks, such as storage device 709. Volatile media include dynamic memory, such as main memory 705. Transmission media include coaxial cables, copper wire, and fiber optics, including the wires that comprise bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions or data to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) and a laptop. An infrared detector on the portable computing device receives the information and instructions borne by the infrared signal and places the data on a bus. The bus conveys the data to main memory, from which a processor retrieves and executes the instructions. The instructions or data received by main memory may optionally be stored on storage device either before or after execution by processor.

While the present invention has been described in connection with a number of embodiments and implementations, the present invention is not so limited but covers various obvious modifications and equivalent arrangements, which fall within the purview of the appended claims.

What is claimed is:

1. A computer-readable medium bearing instructions in a markup language for interactively presenting information to a user, said instructions arranged, upon processing by a rendering agent, to cause one or more processors executing the rendering agent to perform the steps of:
    displaying simultaneously a first chart and a second chart on a web page;
    setting a plurality of active regions on the first chart wherein each active region is responsive to an event and performs an action in response to the event;
    detecting an event relating to the first chart; and
    in response to the event relating to the first chart, performing the action of replacing the second chart with a third chart so as to display simultaneously the first chart and the third chart on the web page;
        wherein the instructions in the markup language to simultaneously display the first chart and the second chart and replace the second chart with the third chart is stored on the web page as one continuous stream of markup language and is generated based on chart content information and chart styling information obtained for the first chart, the second chart and the third chart.

2. A computer-readable medium according to claim 1, wherein:
    the event includes a cursor control event relating to one of the active regions.

3. A computer-readable medium according to claim 2, wherein said instructions are further arranged to cause the one or more processors executing the rendering agent to perform the step of:
    selecting the third chart from a plurality of charts based on the one of the active regions indicated by the cursor control event.

4. A computer-readable medium according to claim 3, wherein said instructions are further arranged to cause the one or more processors executing the rendering agent to perform the step of:
    detecting another cursor control event, wherein other cursor control event relates to another one of the active regions;
    in response to the other cursor control event, performing the steps of:
    selecting a fourth chart from the plurality of charts based on the other of the active regions indicated by the other cursor control event; and
    replacing the third chart with the fourth chart so as to display simultaneously the first chart and the third chart on the web page.

5. A computer-readable medium according to claim 1, wherein the event includes a movement of a cursor over the first chart, a movement of the cursor out of the first chart, or a click when the cursor is positioned over the first chart.

6. A computer-readable medium according to claim 1, wherein the instructions in the markup language are embodied in the web page and comprise:
    a map element specifying an image map;
    a first image element referencing the first chart for display on the web page and the image map specified by the map element; and
    a second image element referencing the second chart for display on the web page;
    wherein the map element includes an area element that has an event attribute specifying
    replacement of the second chart with a third chart on the web page in response to the cursor control event on the web page.

7. A computer-readable medium according to claim 6, wherein the step of replacing the second chart with the third chart is performed without loading another web page.

8. A computer-readable medium bearing instructions in a markup language for interactively presenting information to a user, said instructions embodied on a single web page comprising:
    a map element specifying an image map;
    a first image element referencing the first chart for display on the single web page and the image map specified by the map element; and
    a second image element referencing the second chart for display on the single web page;
    wherein the map element includes an area element that has an event attribute specifying replacement of the second chart with a third chart on the single web page in response to an event on the single web page; wherein the instructions are operable to simultaneously display first chart and a second chart on the web page and simultaneously display the first chart and the third chart on the web page in response to the event; wherein the instructions in the markup language to simultaneously display the first chart and the second chart and replace the second chart with the third chart is stored on the web page as one continuous stream of markup language and is generated based on chart content information and chart styling information obtained for the first chart, the second chart and the third chart.

9. A computer-readable medium bearing instructions in a markup language for interactively presenting information to a user, said instructions embodied on a single web page comprising:
    a map element specifying an image map;

a first image element referencing a first image to be rendered in a first area on the single web page and the image map; and a second image element referencing a second image to be rendered in a second area on the single web page; wherein the map element includes an area element that has:

a shape attribute specifying a geometry for display on the single web page that overlaps at least part of the first area and does not overlap the second area; and an event attribute specifying replacement of the second image with a third image on the single web page in response to an event; wherein the instructions are operable to simultaneously display first chart and a second chart on the web page and simultaneously display the first chart and the third chart on the web page in response to the event; wherein the instructions in the markup language to simultaneously display the first chart and the second chart and replace the second chart with the third chart is stored on the web page as one continuous stream of markup language and is generated based on chart content information and chart styling information obtained for the first chart, the second chart and the third chart.

10. A computer-readable medium as in claim 9, wherein the event includes a movement of a cursor into the geometry specified by the shape attribute.

11. A computer-readable medium as in claim 10, wherein the map element includes another area element that has:

another shape attribute specifying another geometry for display on the single web page that overlaps at least part of the first area and does not overlap the second area; and another event attribute specifying replacement of the second image with a fourth image on the single web page in response to another movement of the cursor into the other geometry specified by the other shape attribute.

12. A computer-readable medium bearing instructions in a markup language for interactively presenting information to a user, said instructions arranged, upon processing by a rendering agent, to cause one or more processors executing the rendering agent to perform the steps of:

displaying simultaneously a first chart, a second chart, and a third chart on a web page;

setting a plurality of active regions on the first chart wherein each active region is responsive to an event and performs an action in response to the event;

in response to an event relating to the first chart, performing the action of replacing the second chart with a fourth chart and replacing the third chart with a fifth chart so as to display simultaneously the first chart, the fourth chart, and the fifth chart on the web page; and in response to an event relating to the second chart, performing the action of replacing the third chart with a sixth chart so as to display simultaneously the first chart, second chart, and the sixth chart on the web page;

wherein the instructions in the markup language to simultaneously display a first chart, a second chart, and a third chart and replace the second chart with a fourth chart, replace the third chart with a fifth chart so as to display simultaneously the first chart, the fourth chart, and the fifth chart on the web page and replace the third chart with a sixth chart so as to display simultaneously the first chart, second chart, and the sixth chart on the web page is stored on the web page as one continuous stream of markup language and is generated based on chart content information and chart styling information for the first chart, the second chart, the third chart, the fourth chart, the fifth chart, and the sixth chart.

13. A computer-readable medium according to claim 12, said instructions comprising:

a first map element specifying a first image map;

a second map element specifying a second image map;

a first image element referencing the first chart and the first image map; and a second image element referencing the second chart and the second image map; a third image element referencing the third chart;

wherein the first map element includes an area element that has an event attribute specifying replacement of the second image map with a third image map in response to an event.

14. A computer-readable medium bearing instructions in a markup language for interactively presenting information to a user, said instructions comprising:

a first map element specifying a first image map;

a second map element specifying a second image map;

image element referencing a first image to be rendered in a first area and the first image map;

a second image element referencing a second image to be rendered in a second area and the second image map; and a third image element referencing a third image to be rendered in a third area;

wherein the first map element includes an area element that has:

a shape attribute specifying a geometry that overlaps at least part of the first area and does not overlap the second area; and an event attribute specifying replacement of the second image map with a third image map in response to an event; wherein the instructions in the markup language to render the first image map and the second image map and replace the second image map with the third image map is stored on the web page as one continuous stream of markup language and is generated based on chart content information and chart styling information.

15. A computer-readable medium according to claim 14, wherein the event attribute further specifies replacement of the second image with a fourth image and replacement of the third image with a fifth image in response to the event.

16. A computer-readable medium according to claim 1, wherein said step of replacing the second chart with the third chart includes reassigning a first source attribute in a Document Object Model (DOM) object to reference an image stored in an image file associated with a second source attribute.

17. A computer-readable medium according to claim 1, wherein said event relating to the first chart is a mouseover event relating to the first chart.

18. A method for interactively presenting information to a user employing instructions in a markup language comprising the steps of:

displaying simultaneously a first chart and a second chart on a web page;

setting a plurality of active regions on the first chart wherein each active region is responsive to an event and performs an action in response to the event;

detecting an event relating to the first chart; and in response to the event relating to the first chart, performing the action of replacing the second chart with a third chart so as to display simultaneously the first chart and the third chart on the web page;

wherein the instructions in the markup language to simultaneously display the first chart and the second chart and replace the second chart with the third chart is stored on the web page as one continuous stream of markup language and is generated based on chart content information and chart styling information obtained for the first chart, the second chart and the third chart.

19. A method according to claim 18, further comprising the step of:

selecting the third chart from a plurality of charts based on the one of the active regions indicated by the cursor control event.

20. A method for interactively presenting information to a user employing instructions in a markup language comprising the steps of:

a map element specifying an image map;

a first image element referencing the first chart for display on the single web page and the image map specified by the map element; and a second image element referencing the second chart for display on the single web page;

wherein the map element includes an area element that has an event attribute specifying replacement of the second chart with a third chart on the single web page in response to an event on the single web page; wherein the instructions are operable to simultaneously display first chart and a second chart on the web page and simultaneously display the first chart and the third chart on the web page in response to the event; wherein the instructions in the markup language to simultaneously display the first chart and the second chart and replace the second chart with the third chart is stored on the web page as one continuous stream of markup language and is generated based on chart content information and chart styling information obtained for the first chart, the second chart and the third chart.

21. A system for interactively presenting information to a user employing instructions in a markup language comprising:

a processor operable to execute computer program instructions; and a memory operable to store computer program instructions executable by the processor, for performing the steps of:

displaying simultaneously a first chart and a second chart on a web page;

setting a plurality of active regions on the first chart wherein each active region is responsive to an event and performs an action in response to the event;

detecting an event relating to the first chart; and in response to the event relating to the first chart, performing the action of replacing the second chart with a third chart so as to display simultaneously the first chart and the third chart on the web page;

wherein the instructions in the markup language to simultaneously display the first chart and the second chart and replace the second chart with the third chart is stored on the web page as one continuous stream of markup language and is generated based on chart content information and chart styling information obtained for the first chart, the second chart and the third chart.

22. A system according to claim 21, further comprising the step of:

selecting the third chart from a plurality of charts based on the one of the active regions indicated by the cursor control event.

23. A system for interactively presenting information to a user employing instructions in a markup language comprising:

a processor operable to execute computer program instructions; and a memory operable to store computer program instructions executable by the processor, for performing the steps of:

a map element specifying an image map;

a first image element referencing the first chart for display on the single web page and the image map specified by the map element; and a second image element referencing the second chart for display on the single web page;

wherein the map element includes an area element that has an event attribute specifying replacement of the second chart with a third chart on the single web page in response to an event on the single web page;

wherein the instructions are operable to simultaneously display first chart and a second chart on the web page and simultaneously display the first chart and the third chart on the web page in response to the event; wherein the instructions in the markup language to simultaneously display the first chart and the second chart and replace the second chart with the third chart is stored on the web page as one continuous stream of markup language and is generated based on chart content information and chart styling information obtained for the first chart, the second chart and the third chart.

* * * * *

UNITED STATES PATENT AND TRADEMARK OFFICE
CERTIFICATE OF CORRECTION

| | |
|---|---|
| PATENT NO. | : 7,363,584 B1 |
| APPLICATION NO. | : 09/829903 |
| DATED | : April 22, 2008 |
| INVENTOR(S) | : Molesky |

Page 1 of 1

It is certified that error appears in the above-identified patent and that said Letters Patent is hereby corrected as shown below:

On sheet 5 of 12, in Figure 5A, line 28, after "agechart" insert -- ' --.

In column 4, line 32, delete "MICROSOF™" and insert -- MICROSOFT™ --, therefor.

In column 7, line 1, delete "on Blur" and insert -- onBlur --, therefor.

In column 7, line 7, delete "on Focus" and insert -- onFocus --, therefor.

In column 7, line 8, delete "onhelp" and insert -- onHelp --, therefor.

In column 8, line 23, before "bars" insert -- " --.

In column 9, line 48, before "FIG." insert -- In --.

Signed and Sealed this

Tenth Day of November, 2009

David J. Kappos
*Director of the United States Patent and Trademark Office*